United States Patent
Lim

(10) Patent No.: US 9,653,724 B2
(45) Date of Patent: May 16, 2017

(54) SECONDARY BATTERY, AND SECONDARY BATTERY MODULE AND SECONDARY BATTERY PACK COMPRISING THE SAME

(71) Applicant: LG Chem, Ltd., Seoul (KR)

(72) Inventor: Seong-Yoon Lim, Daejeon (KR)

(73) Assignee: LG Chem, Ltd. (KR)

( * ) Notice: Subject to any disclaimer, the term of this patent is extended or adjusted under 35 U.S.C. 154(b) by 380 days.

(21) Appl. No.: 14/475,743

(22) Filed: Sep. 3, 2014

(65) Prior Publication Data

US 2014/0370338 A1 Dec. 18, 2014

Related U.S. Application Data

(63) Continuation of application No. PCT/KR2014/000414, filed on Jan. 15, 2014.

(30) Foreign Application Priority Data

May 6, 2013 (KR) ........................ 10-2013-0050637

(51) Int. Cl.
*H01M 2/34* (2006.01)
*G01K 7/16* (2006.01)
(Continued)

(52) U.S. Cl.
CPC .............. *H01M 2/348* (2013.01); *G01K 7/16* (2013.01); *H01M 10/486* (2013.01);
(Continued)

(58) Field of Classification Search
CPC ....... H01M 2/348; H01M 10/486; G01K 7/16
(Continued)

(56) References Cited

U.S. PATENT DOCUMENTS

| | | | |
|---|---|---|---|
| 6,284,404 B1 | 9/2001 | Horie et al. | |
| 2002/0160257 A1 | 10/2002 | Lee et al. | |

(Continued)

FOREIGN PATENT DOCUMENTS

| | | |
|---|---|---|
| JP | 2000-058103 A | 2/2000 |
| JP | 2002313431 | 10/2002 |

(Continued)

OTHER PUBLICATIONS

International Search Report from PCT/KR2014/000414, dated May 16, 2014.

*Primary Examiner* — Basia Ridley
*Assistant Examiner* — James Erwin
(74) *Attorney, Agent, or Firm* — Lerner, David, Littenberg, Krumholz & Mentlik, LLP

(57) ABSTRACT

A secondary battery according to the present disclosure includes a cell assembly including a unit cell having at least one non-coated passage formed across an electrode plate, a temperature sensor including a temperature sensing unit located within the non-coated passage and a sensor lead extending from the temperature sensing unit, and a battery case to receive the cell assembly and which is sealed in a state that the sensor lead is drawn outside.

According to the present disclosure, a temperature change of the secondary battery may be measured quickly and correctly, and thus, the secondary battery may be controlled more minutely in response to a temperature change, and gas generated in the battery case during charging and discharging of the secondary battery may be easily discharged to a surrounding area of the cell assembly, thereby preventing a battery efficiency reduction phenomenon.

15 Claims, 8 Drawing Sheets

(51) Int. Cl.
*H01M 10/48* (2006.01)
*H01M 10/04* (2006.01)
(52) U.S. Cl.
CPC .... *H01M 10/0431* (2013.01); *H01M 2200/10* (2013.01); *H01M 2220/20* (2013.01)
(58) Field of Classification Search
USPC .......................................................... 429/62
See application file for complete search history.

(56) References Cited

U.S. PATENT DOCUMENTS

| | | |
|---|---|---|
| 2002/0160258 A1 | 10/2002 | Lee et al. |
| 2003/0013012 A1 | 1/2003 | Ahn et al. |
| 2009/0325043 A1 | 12/2009 | Yoon et al. |
| 2010/0087778 A1 | 4/2010 | Genosar et al. |
| 2012/0040235 A1 | 2/2012 | Cho et al. |
| 2013/0004811 A1* | 1/2013 | Banerjee .................. G01K 7/16 429/62 |
| 2013/0017431 A1* | 1/2013 | Frisk .................. H01M 2/1606 429/145 |

FOREIGN PATENT DOCUMENTS

| | | |
|---|---|---|
| KR | 100497147 B1 | 6/2005 |
| KR | 100515571 B1 | 9/2005 |
| KR | 100515572 B1 | 9/2005 |
| KR | 20110058657 A | 6/2011 |
| KR | 20120013883 A | 2/2012 |
| KR | 20120029320 A | 3/2012 |
| WO | 2013047994 A2 | 4/2013 |

* cited by examiner

SECONDARY BATTERY, AND SECONDARY BATTERY MODULE AND SECONDARY BATTERY PACK COMPRISING THE SAME

CROSS-REFERENCE TO RELATED APPLICATION

The present application is a continuation of International Application No. PCT/KR2014/000414 filed on Jan. 15, 2014, which claims priority to Korean Patent Application No. 10-2013-0050637 filed in the Republic of Korea on May 6, 2013, the disclosures of which are incorporated herein by reference.

TECHNICAL FIELD

The present disclosure relates to a secondary battery, and a secondary battery module and a secondary battery pack comprising the same, and more particularly, to a secondary battery with a gas discharge passage and a temperature sensor, and a secondary battery module and a secondary battery pack comprising the same.

BACKGROUND ART

Recently, with exhaustion of fossil energy and concern about environmental pollution, there is an increasing interest in electric products operating using electrical energy, but not using fossil energy.

Hence, with the increasing development and consumption of mobile devices, electric vehicles, hybrid vehicles, power storage systems, uninterrupted power supplies, or the like, the consumption of secondary batteries as energy sources are drastically increasing. Particularly, secondary batteries in use for electric vehicles or hybrid vehicles are high output and large capacity secondary batteries, and studies are actively being conducted thereon.

Currently, common secondary batteries include nickel-cadmium batteries, nickel-hydrogen batteries, nickel-zinc batteries, lithium secondary batteries, and the like, and particularly, lithium secondary batteries have a high energy density per unit weight when compared to other secondary batteries such as existing lead storage batteries, nickel-cadmium batteries, nickel-hydrogen batteries, and nickel-zinc batteries, and allows rapid charging, and thus, they are being increasingly used. Also, when compared to nickel-cadmium batteries or nickel-metal hydride batteries, lithium secondary batteries have triple operating voltage and excellent characteristics in terms of energy density per unit weight, and for these reasons, are being increasingly used.

A lithium secondary battery may be categorized into a lithium ion battery using a liquid electrolyte and a lithium ion polymer battery using a polymer solid electrolyte, based on an electrolyte type. Also, a secondary battery may be classified into a pouch-type secondary battery, a cylindrical secondary battery, and a prismatic secondary battery based on an outer case type.

A pouch-type secondary battery, a type of a secondary battery, includes a pouch-shaped case made of an aluminum laminate sheet, and a cell assembly including a stack of plural electrochemical cells, each including a cathode plate/separation film/anode plate, received in the pouch-shaped case. This pouch-type secondary battery has advantages of low battery fabrication costs, a remarkably reduced weight, and easy shape adaptation over a can-type secondary battery.

However, a pouch-type secondary battery is very vulnerable to high temperature. That is, when a pouch-type secondary battery is overheated, gas is generated inside and an outer case or pouch-shaped case swells up. When swelling comes to extremes, the secondary battery may explode. Also, when the temperature of the secondary battery drastically increases due to a short circuit current, gas generated in the outer case ignites, causing explosion accompanied by a fire accident.

Conventionally, to prevent a secondary battery from being overheated, a protection device that measures a temperature change of a secondary battery, and stops charging and discharging of the secondary battery immediately when temperature excessively increases, has been widely used.

Such a conventional secondary battery protection device measures a surface temperature of a secondary battery, to be specific, a surface temperature of a pouch-shaped case, and monitors the measurements. When a temperature change of a secondary battery is monitored in this way, unfortunately, follow-up measures can be taken but precautionary measures are virtually impossible.

That is, a representative cause of a drastic temperature increase of a secondary battery is a flow of short circuit current. A short circuit current is primarily caused by a short circuit occurring in a secondary battery due to penetration of a needle-shape object or the like, or a short circuit occurring in an electronic device connected to the secondary battery or the like.

When a short circuit phenomenon occurs in a secondary battery, a radical electrochemical reaction occurs between a cathode plate and an anode plate and thereby heat is generated. The generated heat passes to a surrounding material, and by this heat transfer, a surface temperature of a pouch-shaped outer case rises at a high speed.

In consideration of heat generation and a heat transfer mechanism, there is unavoidably a predetermined time difference from an occurrence time of a short circuit phenomenon to a start time of a drastic increase in surface temperature of a pouch-shaped outer case. This is because it takes some time to transfer heat generated between a cathode plate and an anode plate of a secondary battery to a surface of a pouch-shaped outer case.

Thus, a point in time at which a secondary battery protection device detects overheat of a pouch-shaped outer case comes only after a problem with safety of the secondary battery occurred due to a flow of short circuit current for a considerable amount of time. To solve this problem, there is a need for a method for detecting an abnormal temperature change quickly and correctly by directly measuring an internal temperature of a secondary battery.

Meanwhile, gas is generated by a chemical reaction in a battery case during charging and discharging of a secondary battery, and the generated gas applies pressure between electrode plates in a close contact, causing a loose phenomenon of the electrode plates. This loose phenomenon of the electrode plates leads to a loss in the viewpoint of energy efficiency of the secondary battery.

Accordingly, there is an urgent need for development of a secondary battery having a structure for preventing a loose phenomenon caused by gas generation while measuring a temperature change of a secondary battery correctly and quickly.

DISCLOSURE

Technical Problem

The present disclosure is designed to solve the problem of the related art, and therefore, the present disclosure is directed to providing a secondary battery having a structure for allowing gas generated during charging/discharging of the secondary battery to be easily discharged to a surrounding area of a cell assembly, as well as measuring a temperature change of the secondary battery quickly and correctly, and a secondary battery module comprising the same.

Rather, the object of the present disclosure is not limited to the above, and the other objects will be better understood by those having ordinary skill in the art from the following detailed description.

Technical Solution

To achieve the above object, a secondary battery according to the present disclosure includes a cell assembly including a unit cell having at least one non-coated passage formed across an electrode plate, a temperature sensor including a temperature sensing unit located within the non-coated passage and a sensor lead extending from the temperature sensing unit, and a battery case to receive the cell assembly and which is sealed in a state that the sensor lead is drawn outside.

The cell assembly may include a plurality of unit cells, and the temperature sensing unit may be located within the non-coated passage formed in a unit cell located at a center of the cell assembly among the plurality of unit cells.

The unit cell may include a cathode plate having a cathode tab, an anode plate having an anode tab, and a separation film interposed between the cathode plate and the anode plate.

The non-coated passage may be formed at a location corresponding to at least one of the cathode tab and the anode tab in a direction parallel to a direction in which the cathode tab and the anode tab extend.

The temperature sensing unit may be attached to a location near the cathode tab or the anode tab within the non-coated passage.

The secondary battery may further include a pair of electrode leads connected to the cell assembly and drawn out of the battery case.

The sensor lead may be drawn out of the battery case through an area other than an area where the electrode leads are drawn, among an edge area of the battery case.

The temperature sensing unit may be coated with an insulation film.

The insulation film may be made from a same material as the separation film.

The insulation film may be made from a polymer material having a higher softening point than the separation film.

The temperature sensing unit may be any one selected from a resistance thermometer detector (RTD), a thermocoupler, and a thermistor.

Meanwhile, the above object may be also achieved by a secondary battery module, and the secondary battery module according to the present disclosure includes the above secondary battery, and a control unit to stop operation of the secondary battery when an internal temperature of the secondary battery measured by the temperature sensor exceeds a threshold temperature.

Also, the above object may be also achieved by a battery pack, and the secondary battery pack according to the present disclosure includes at least two secondary battery modules described in the foregoing.

Furthermore, the above object may be also achieved by a battery operating system, and the battery operating system includes the battery pack, and a load which is supplied with power from the battery pack.

Here, the load may be an electric driving means or a power inverter circuit.

Advantageous Effects

According to one aspect of the present disclosure, a temperature change of a secondary battery may be measured quickly and correctly, and thus, the secondary battery may be controlled more minutely in response to a temperature change.

According to another aspect of the present disclosure, when an internal short or abnormal heat generation occurs in a secondary battery, an abnormal temperature increase of the secondary battery may be sensed more correctly and quickly, and accordingly, a safety accident risk caused by a thermal runaway phenomenon may be reduced.

According to still another aspect of the present disclosure, gas generated in a battery case during charging and discharging of a secondary battery may be easily discharged to a surrounding area of a cell assembly, and as a result, a reduction in battery efficiency due to a loose phenomenon of electrode plates may be prevented.

According to yet another aspect of the present disclosure, as a temperature sensor for measuring the temperature of a secondary battery is installed in a non-coated passage for gas discharge, the temperature of the secondary battery may be controlled more minutely without an additional loss of a coated area resulting from installation of a temperature sensor.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIGS. 1 through 4 are diagrams illustrating a construction and a structure of a secondary battery 10 according to an exemplary embodiment of the present disclosure.

Figure 1:
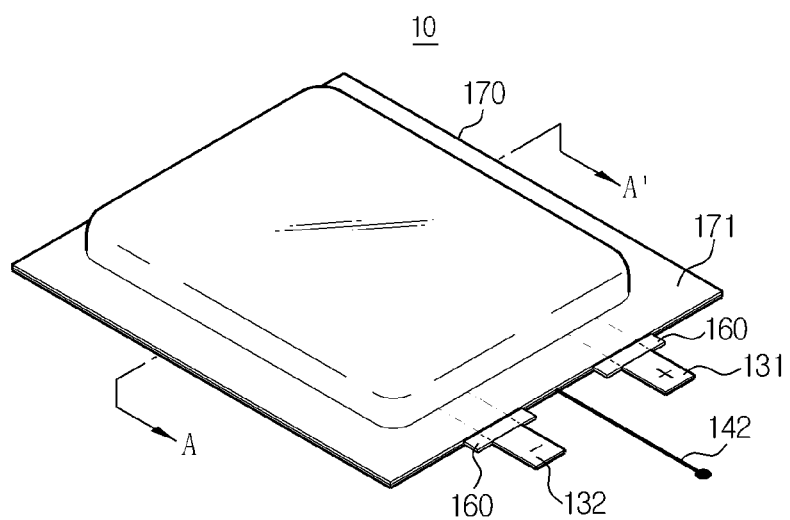
FIG. 1 is a perspective view illustrating a secondary battery according to an exemplary embodiment of the present disclosure.
Figure 2:
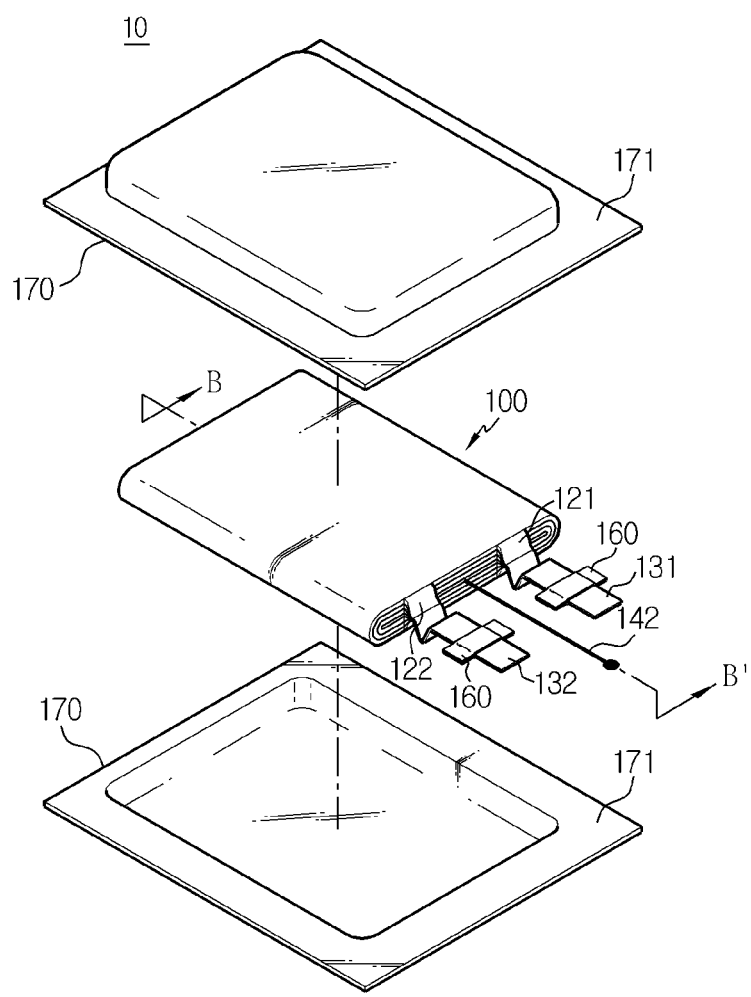
FIG. 2 is an exploded perspective view illustrating an internal structure of a secondary battery according to an exemplary embodiment of the present disclosure.
Figure 3:
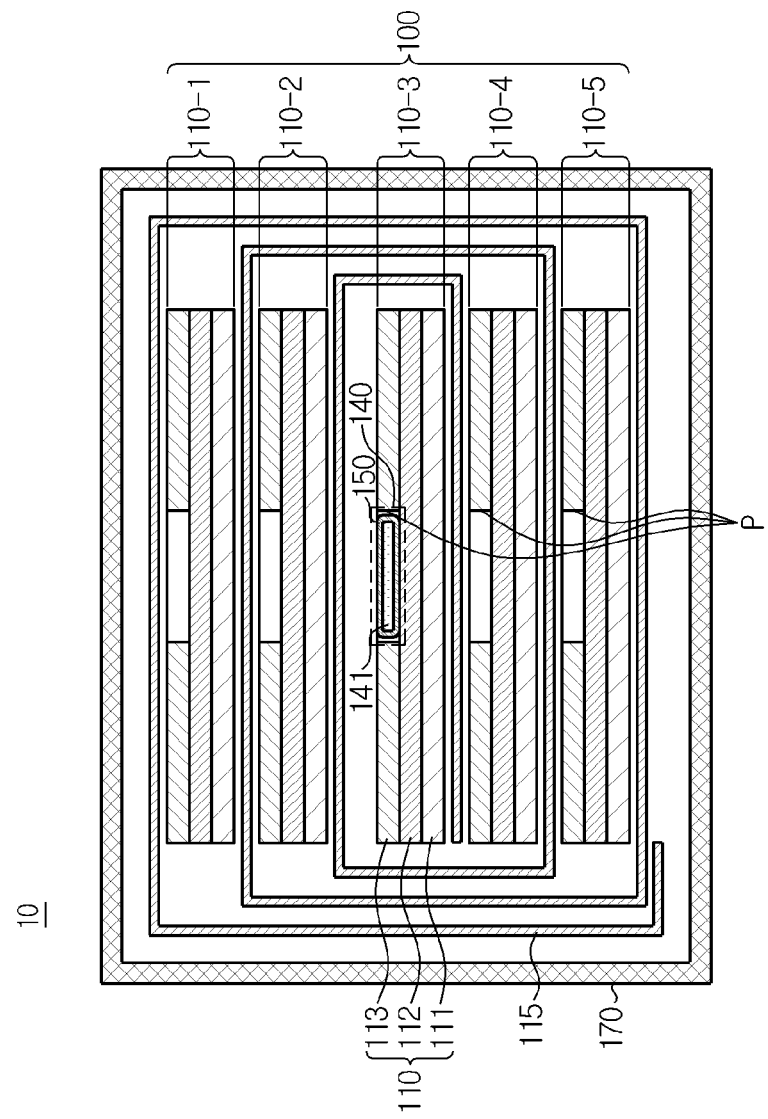
FIG. 3 is a cross-sectional view illustrating an internal structure of the secondary battery of FIG. 1 taken along the line A-A'.
Figure 4:
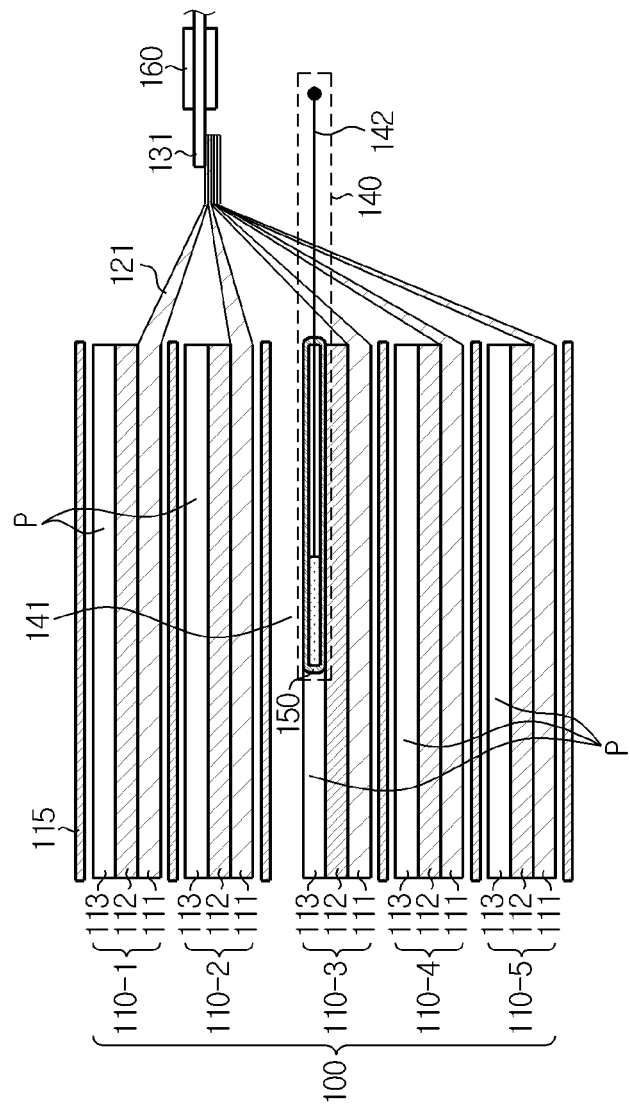
FIG. 4 is a cross-sectional view illustrating a cell assembly shown in FIG. 2, taken along the line B-B'.

First, FIG. 1 is a perspective view of the secondary battery 10 according to an exemplary embodiment of the present disclosure, and FIG. 2 is an exploded perspective view illustrating an internal structure of the secondary battery 10 according to an exemplary embodiment of the present disclosure. Also, FIG. 3 is a cross-sectional view illustrating an internal structure of the secondary battery 10 of FIG. 1 taken along the line A-A', and FIG. 4 is a cross-sectional view illustrating a cell assembly 100 shown in FIG. 2, taken along the line B-B'.

Referring to FIGS. 1 through 4, the secondary battery 10 according to an exemplary embodiment of the present disclosure includes the cell assembly 100, a temperature sensor 140, and a battery case 170.

The cell assembly 100 has a stack structure of at least two unit cells 110, each including a cathode plate 111, a separation film 112, and an anode plate 113. For each of the unit cells 110, a plurality of cathode tabs 121 and anode tabs 122 jutting out from the cathode plate 111 and the anode plate 113 are electrically connected to a cathode lead 131 and an anode lead 132, respectively. The cathode tab 121 and the anode tab 122 may be in a form of extending from the cathode plate 111 and the anode plate 113, and correspond to a non-coated area which is not coated with an electrode active material.

In the depiction of the electrode plates 111 and 113, an electrode current collector and an electrode active material are illustrated without distinction in the drawings of the present disclosure. However, it is just for convenience of illustration, it will be clearly understood by an ordinary person skilled in the art that the cathode plate 111 actually includes a cathode current collector and a cathode active material formed on at least one surface among both surfaces of the cathode current collector, and the anode plate 113 includes an anode current collector and an anode active material formed on at least one surface among both surfaces of the anode current collector.

Meanwhile, referring to FIGS. 3 and 4, the cathode plate 111 and/or the anode plate 113 of at least one of the unit cells 110 has at least one non-coated passage P formed across the electrode plates 111 and 113. The following description is provided, with an example of the non-coated passage P formed across only the anode plate 113.

The non-coated passage P corresponds to a non-coated pattern formed across the cathode plate 113, and is an area formed without coating a cathode active material on a cathode current collector. The non-coated passage P allows gas generated by a chemical reaction occurring in the battery case 170 to be easily discharged to a surrounding area of the cell assembly 100.

Here, the surrounding area of the cell assembly 100 represents a space between the cell assembly 100 and the battery case 170. When gas is not smoothly discharged to the surrounding area, a loose phenomenon between the electrode plates 111 and 113 occurs by pressure produced between the electrode plates 111 and 113, resulting in reduced efficiency of the secondary battery 10.

Accordingly, in the case of a secondary battery having the non-coated passage P for gas discharge, like the secondary battery 10 according to an exemplary embodiment of the present disclosure, unnecessary efficiency reduction caused by internal gas generation may be prevented.

The secondary battery 10 according to the present disclosure may further include an insulation tape 160. The insulation tape 160 serves to enhance adhesion between the battery case 170, and the cathode lead 131 and the anode lead 132. The insulation tape 160 is not limited to a specific type if it has an insulating property while improving adhesion between the cathode lead 131 and the anode lead 132, and the battery case 170.

Preferably, the cell assembly 100 has a stack folding structure. For the stack folding-type cell assembly 100, the unit cells 110 cut into a predetermined size, each having the separation film 112 interposed between the cathode plate 111 and the anode plate 113, are arranged on a long roll film 115. Also, the roll film 115 and the unit cells 110 are rolled up together to form the cell assembly 100. Such a cell assembly having the above structure is disclosed in Korean Patent Nos. 0515571, 0515572, and 0497147, and Korean Patent Publication No. 2011-0058657 by the Inventor. However, the secondary battery 10 according to the present disclosure may include cell assemblies of a jelly-roll type and a simple stack type as well as the cell assembly 100 of a stack folding structure, and the present disclosure is not limited by the structure of the exemplary cell assembly 100.

The temperature sensor 140 includes a temperature sensing unit 141 and a sensor lead 142, and the temperature sensing unit 141 is attached to at least one of the non-coated passages P. The temperature sensing unit 141 senses the temperature of the unit cells 110 and outputs this as an electrical signal. The electrical signal is outputted to outside through the sensor lead 142.

The temperature sensing unit 141 may include any one of a resistance thermometer detector (RTD), a thermocoupler, and a thermistor. The RTD is a temperature measuring device using a characteristic that a resistance value changes with temperature, and generally, is made using a 0.02 mm platinum wire. The thermocoupler is a temperature measuring device in which two types of coupled metals produce an electromotive force in response to temperature. Also, the thermistor is a temperature measuring device using a characteristic that a resistance value changes with a change in temperature of a semiconductor.

However, the temperature measuring device used as the temperature sensing unit 141 is not limited to the above example, and it is obvious that all temperature measuring devices readily applicable at the level of an ordinary person skilled in the art may be contemplated.

Meanwhile, the temperature sensing unit 141 may be coated with an insulation film 150 to improve adhesion between the temperature sensing unit 141 and the unit cell 110. The insulation film 150 not only improves adhesion between the temperature sensing unit 141 and the unit cell 110, but also limits a phenomenon in which the temperature sensing unit 14 causes an unnecessary reaction with an electrolyte filled in the secondary battery 141 or is damaged by the electrolyte. The insulation film 150 may also coat the sensor lead 142 when needed, along with the temperature sensing unit 141.

The insulation film 150 may be made from the same material as the separation film 112 or the roll film 115. Alternatively, the insulation film 150 may be made from a polymer material having a higher softening point than the separation film 112 or the roll film 115.

When the insulation film 150 is made from the same material as the separation film 112 or the roll film 115, production of the secondary battery 10 according to the present disclosure is facilitated. Meanwhile, when the insulation film 150 is made from a polymer material having a higher softening point than the separation film 112 or the roll film 115, the temperature sensing unit 141 may prevent the insulation film 150 from being exposed outside even if the temperature of the secondary battery 10 increases up to a temperature at which a shrinkage phenomenon of the separation film 112 or the roll film 115 occurs.

When the temperature sensing unit 141 is attached to only some certain unit cells, it is advantageous that the temperature sensing unit 141 is attached to the unit cell 110-3 at least located at the center of the cell assembly 100 among the unit cells 110-1 through 110-5. This is to measure the internal temperature of the secondary battery 10 correctly.

That is, the cell assembly 100 of the secondary battery 10 according to the present disclosure includes at least two unit cells 110. Accordingly, when each unit cell 110 generates heat, the unit cells 110 may have different temperature values based on a location in the cell assembly 110, and the unit cell 110-3 located at the center has a further limitation on heat radiation than the other unit cells 110-1, 110-2, 110-4, and 110-5, as a consequence, has a high possibility that the temperature will rise most quickly.

Accordingly, upon stacking or rolling, if the temperature sensing unit 141 is attached to the unit cell 110-3 located at the center of the cell assembly 100, a temperature change of the secondary battery 10 may be measured more correctly.

A location of the unit cell 110 located at the center within the cell assembly 100 is not limited to the embodiment shown in the drawing. A number of the unit cells 110 may change based on a capacity of the secondary battery 10, and particularly, when a number of the unit cells 110 is even, an ordinary person skilled in the art will understand clearly that the center at which the unit cell 110 is located does not necessarily imply an exact center.

Figure 5:
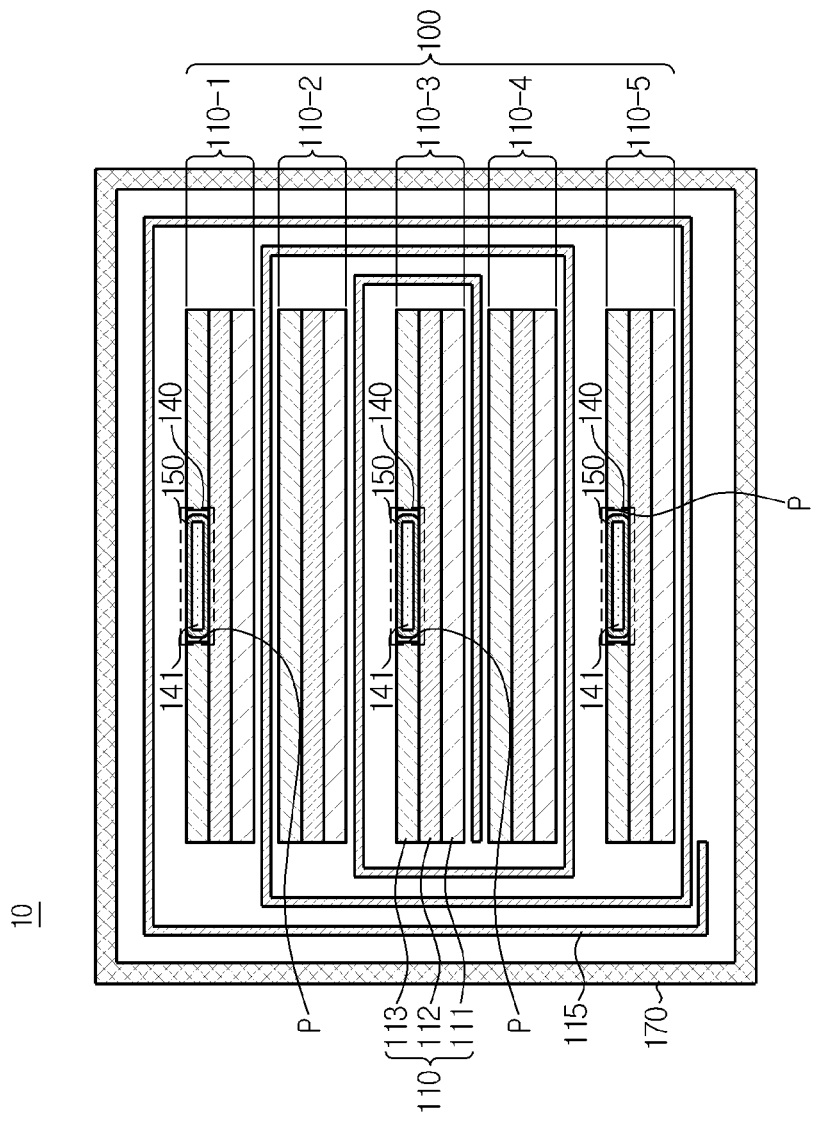
FIG. 5 is a cross-sectional view illustrating an internal structure of a secondary battery according to another exemplary embodiment of the present disclosure.

The secondary battery 10 according to the present disclosure may have the temperature sensor 140 attached within the non-coated passage P formed for each of the plurality of unit cells 110, and its description is provided with reference to FIG. 5.

FIG. 5 is a cross-sectional view illustrating an internal structure of the secondary battery 10 according to another exemplary embodiment of the present disclosure, taken along the line A-A'.

Referring to FIG. 5, each of the unit cells 110 included in the secondary battery 10 may differ in temperature based on locations. Accordingly, the temperature of the unit cells 110 may be measured at multiple locations by attaching the temperature sensor 140 to at least two unit cells 110-1, 110-3, and 110-5. In this case, the unit cells 110-1, 110-3, and 110-5 having the temperature sensor 140 attached thereto are preferably arranged at a regular interval. Through this arrangement, a local temperature change of the secondary battery 10 may be measured quickly and accurately, and further, an internal temperature distribution of the secondary battery 10 may be measured.

The temperature sensing unit 141 attached to each of the plurality of unit cells may be coated with the above-described insulation film 150. Meanwhile, it is obvious that a number of the temperature sensors 140 and an arrangement interval of the unit cells 110 having the temperature sensors 140 attached thereto is not limited to the embodiment shown in the drawings.

The non-coated passage P of the secondary battery 10 according to the present disclosure may be formed at various locations on the electrode plates 111 and 113, and the temperature sensing unit 141 may be also installed at various locations within the non-coated passage P.

Figure 6:
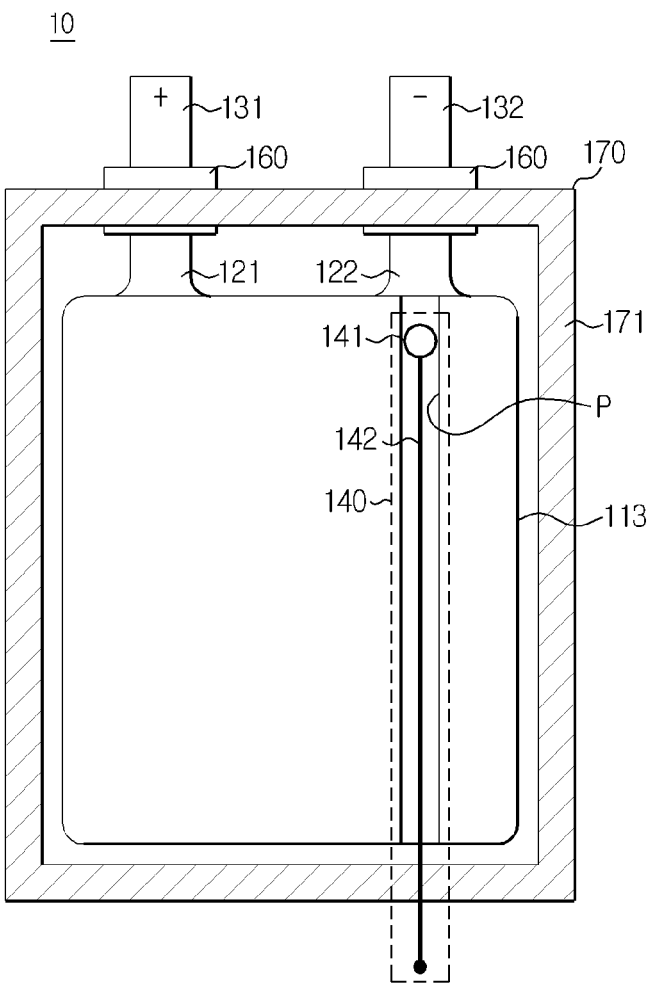
FIG. 6 is a plane cutaway diagram illustrating a secondary battery according to still another exemplary embodiment of the present disclosure.

FIG. 6 is a plane cutaway diagram of the secondary battery 10 illustrating one embodiment for a formation location of the non-coated passage P and an attachment location of the temperature sensing unit 141.

Referring to FIG. 6, the non-coated passage P may be formed at locations corresponding to the electrode tabs 121 and 122 on the anode plate 113 along a direction parallel to a direction in which the electrode tabs 121 and 122 extend, and the temperature sensing unit 141 may be attached within the non-coated passage P. Further, when the temperature sensing unit 141 is attached to a location near the electrode tabs 121 and 122 within the non-coated passage P, it is possible to sense an increase in temperature within the secondary battery 10 more quickly.

That is, when the cell assembly 100 includes the plurality of unit cells 110, an amount of heat generated from the electrode tabs 121 and 122 may greatly increase, and thus, when the temperature sensing unit 141 is installed at a location near the electrode tabs 121 and 122, an abnormality in the secondary battery 10 may be sensed quickly, if any.

Meanwhile, the sensor lead 142 of the secondary battery 10 according to the present disclosure may be exposed outside in various directions.

Figure 7:
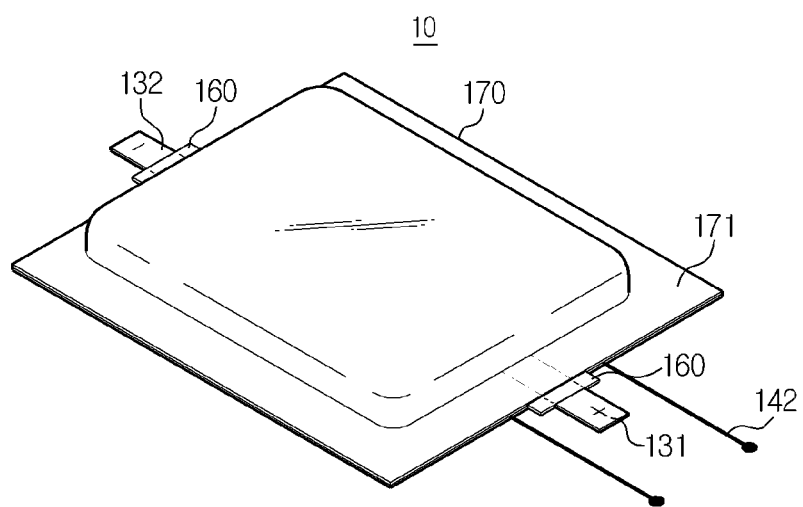
FIG. 7 is a perspective view illustrating a secondary battery according to still another exemplary embodiment of the present disclosure.

That is, the sensor lead 142 may be exposed in the same direction as the cathode lead 131 and the anode lead 132 as shown in FIG. 1. Also, the sensor lead 142 may be exposed outside in a different direction from the cathode lead 131 and the anode lead 132, as shown in FIG. 6. Further, as shown in FIG. 7, in the case of the secondary battery 10 constructed to have the cathode lead 131 and the anode lead 132 drawn in different directions, at least one sensor lead 142 may be exposed in the same direction as the cathode lead 131. Contrary to the illustration, it is obvious that the sensor lead 142 may be exposed in the same direction as the anode lead 132.

The exposure direction of the sensor lead 140 may be variously determined in consideration of a manufacturing environment of the secondary battery 10, a number of the temperature sensors 140, a usage environment of the secondary battery 10, a connection location of a battery management system (BMS) to control the secondary battery 10, and the like. Accordingly, the exposure direction of the sensor lead 142 is not limited to the above embodiment.

However, when the sensor lead 142 is drawn out of the battery case 170 through an area where the electrode leads 131 and 132 are drawn among an edge area 171 of the battery case 170, the problem with sealing performance deterioration at the edge area 171 may occur. Accordingly, it will be more advantageous that the sensor lead 142 is drawn through an area other than the area where the electrode leads 131 and 132 are drawn among the edge area 171 of the battery case 170.

As described in the foregoing, because the secondary battery 10 according to an exemplary embodiment of the present disclosure has the non-coated passage P, a reduction in battery efficiency due to a loose phenomenon of the electrode plates 111 and 113 may be prevented, and as the temperature sensor 140 is provided within the battery case 170, the temperature of the secondary battery 10 may be measured more correctly.

Particularly, because the secondary battery 10 has a structure that the temperature sensing unit 141 is attached within the non-coated passage P, there is no need to form an additional non-coated portion to provide a separate space for the temperature sensing unit 141. That is, the secondary battery 10 has a structure of eliminating the need for an additional reduction in amount of active materials to attach the temperature sensing unit 141, thereby maintaining an excellent energy density.

Meanwhile, the secondary battery 10 according to the present disclosure may be a component of the secondary battery module 20 including the control unit 30 to control the operation of the secondary battery 10.

Figure 8:
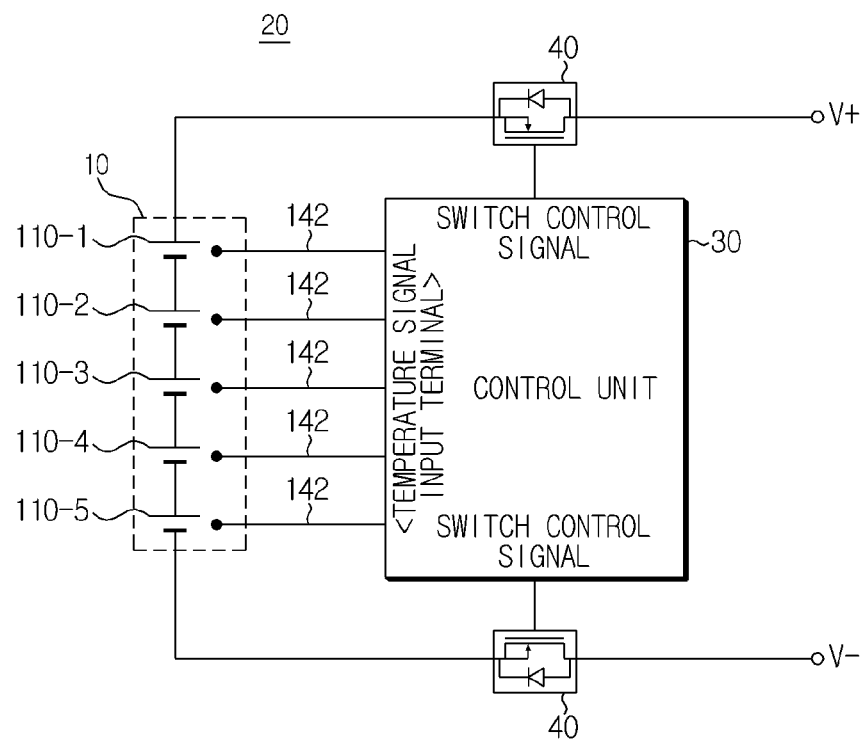
FIG. 8 is a block diagram schematically illustrating a construction of a secondary battery module including a secondary battery according to the present disclosure.

FIG. 8 is a block diagram schematically illustrating a construction of the secondary battery module 20 including the secondary battery 10 according to the present disclosure. Referring to FIG. 8, the sensor lead 142 of the secondary battery 10 according to the present disclosure may be connected to the control unit 30. The control unit 30 receives a temperature sensing signal outputted through the sensor lead 142 during operation of the secondary battery 10. Then, the control unit 30 monitors the temperature of at least one location within the battery case 170 using the temperature sensing signal. In this instance, when the temperature of the at least one location exceeds a preset threshold temperature, a charging or discharging operation of the secondary battery module 20 is stopped.

The control unit 30 may stop the charging or discharging operation of the secondary battery 10 by controlling the switch unit 40 connected to a high potential terminal (V+) and/or a low potential terminal (V−) of the secondary battery 10. However, a method of controlling the secondary battery 10 by the control unit 30 is not limited to the above embodiment, and includes known technologies for controlling the use of the secondary battery 10 and all control methods that may be easily devised from known technologies by an ordinary person skilled in the art.

The control unit 30 may be configured as a microprocessor that may execute a program code to control the secondary battery module 20 according to the present disclosure. Alternatively, the control unit 30 may be configured as a semiconductor chip in which a control flow is implemented in a logic circuit to control the secondary battery module 20 according to the present disclosure. However, the present disclosure is not limited thereto.

Also, the secondary battery 10 according to the present disclosure may be a component of a battery pack including at least two secondary battery modules 20.

Recently, with the growing needs for a large capacity structure as well as utilization as an energy storage source, it is common to use a battery pack having a multi-module structure by connecting a plurality of secondary battery modules 20 in series, in parallel, or a combination thereof.

Generally, the battery pack is constructed to further include a BMS which monitors and controls the state of the secondary battery 10 by applying an algorithm for measurement of an electrical characteristic value including voltage or current, charge/discharge control, voltage equalization control, state of charge (SOC) estimation, and the like. In this case, the control unit 30 of the secondary battery module 20 may be included in the BMS or may be implemented as a separate circuit.

Also, the secondary battery 10 according to the present disclosure may be a component of a battery operating system including the battery pack and a load that is supplied with power form the battery pack.

The battery operating system may be, for example, an electric vehicle (EV), a hybrid electric vehicle (HEV), an electric bike, a power tool, an energy storage system, an uninterruptible power supply (UPS), a portable computer, a mobile phone, a portable audio player, or a portable video player.

Also, the load may be an electric driving means (for example, a motor) that generates a rotational force by power supplied from the battery pack, or a power inverter circuit that inverts power supplied from the battery pack to power required for various circuit components.

According to the present disclosure, because a temperature change of the secondary battery can be measured quickly and correctly, the secondary battery may be controlled more minutely in response to a temperature change. Also, when an internal short circuit or abnormal heat generation occurs in a secondary battery, a rapid increase in internal temperature of the secondary battery may be sensed more quickly, and consequently, a safety accident risk caused by a thermal runaway phenomenon may be reduced.

Hereinabove, the present disclosure has been described by specific embodiments and drawings, but the present disclosure is not limited thereto and it should be understood that various changes and modifications may be made by an ordinary person skilled in the art within the spirit and scope of the disclosure and the appended claims and their equivalents.

Also, in the description of the present disclosure, it should be understood that each element of the secondary battery module 20 of the present disclosure shown in FIG. 8 is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

What is claimed is:

1. A secondary battery comprising:
   a cell assembly including a unit cell that includes a plurality of electrode plates having at least one separation film interposed therebetween, wherein each electrode plate includes an electrode current collector having an electrode active material coated on at least one surface thereof, wherein at least one non-coated passage is formed across at least a first one of the electrode plates, the non-coated passage being defined by an area of the first electrode plate on which the electrode active material is not coated;
   a temperature sensor including a temperature sensing unit located within the non-coated passage and a sensor lead extending from the temperature sensing unit; and
   a battery case to receive the cell assembly and which is sealed in a state that the sensor lead is drawn outside.

2. The secondary battery according to claim 1, wherein the cell assembly includes a plurality of unit cells, and the temperature sensing unit is located within the non-coated passage formed in a unit cell located at a center of the cell assembly among the plurality of unit cells.

3. The secondary battery according to claim 1, wherein the unit cell comprises:

a cathode plate having a cathode tab;
an anode plate having an anode tab; and
a separation film interposed between the cathode plate and the anode plate.

4. The secondary battery according to claim 3, wherein the non-coated passage is formed at a location corresponding to at least one of the cathode tab and the anode tab in a direction parallel to a direction in which the cathode tab and the anode tab extend.

5. The secondary battery according to claim 4, wherein the temperature sensing unit is attached to a location near the cathode tab or the anode tab within the non-coated passage.

6. The secondary battery according to claim 1, wherein the secondary battery further comprises a pair of electrode leads connected to the cell assembly and drawn out of the battery case.

7. The secondary battery according to claim 6, wherein the sensor lead is drawn out of the battery case through an area other than an area where the electrode leads are drawn, among an edge area of the battery case.

8. The secondary battery according to claim 1, wherein the temperature sensing unit is coated with an insulation film.

9. The secondary battery according to claim 8, wherein the insulation film is made from a same material as the separation film.

10. The secondary battery according to claim 8, wherein the insulation film is made from a polymer material having a higher softening point than the separation film.

11. The secondary battery according to claim 1, wherein the temperature sensing unit is any one selected from a resistance thermometer detector (RTD), a thermocoupler, and a thermistor.

12. A secondary battery module comprising:
a secondary battery defined in claim 1; and
a control unit to stop operation of the secondary battery when an internal temperature of the secondary battery measured by the temperature sensor exceeds a threshold temperature.

13. A battery pack comprising:
at least two secondary battery modules defined in claim 12.

14. A battery operating system comprising:
a battery pack defined in claim 13; and
a load which is supplied with power from the battery pack.

15. The battery operating system according to claim 14, wherein the load is an electric driving means that operates by power supplied from the battery pack or a power inverter circuit.

* * * * *